Feb. 16, 1932.  J. C. MILLER  1,845,093
BATCH MEASURING DEVICE
Filed July 13, 1929   2 Sheets-Sheet 2

INVENTOR.
Jacob C. Miller
BY Wheeler, Wheeler & Wheeler
ATTORNEYS

Patented Feb. 16, 1932

1,845,093

UNITED STATES PATENT OFFICE

JACOB C. MILLER, OF MILWAUKEE, WISCONSIN, ASSIGNOR TO BADGER METER MANUFACTURING COMPANY, OF MILWAUKEE, WISCONSIN, A CORPORATION OF WISCONSIN

BATCH MEASURING DEVICE

Application filed July 13, 1929. Serial No. 378,045.

This invention relates to improvements in batch measuring devices.

The invention is particularly applicable to the measurement of batches of liquid such, for example, as are used in making up batches of concrete mix. Prior to this invention, it was the practice either to guess at the amount of water required for a given batch of concrete mix or to measure the required amount of water by hand with pails or the like. By means of the present invention, the water is measured with great exactness by a standard meter and through the mechanism to which this invention relates the water flowing from a source of supply under pressure is automatically cut off when the meter has passed the amount of water for which the device is set.

It is the object of the invention to provide a simple, economical means of accurately measuring any desired quantity of water within the capacity of the device, facilitating the resetting of the device for the measurement of a new batch, and utilizing the slight amount of power developed by the meter for actuating a cut-off valve in the water supply line. Other purposes will appear in the discussion of the functions of the parts of the mechanism.

In the drawings—

Like parts are identified by similar reference numerals throughout the several views.

Figure 1:
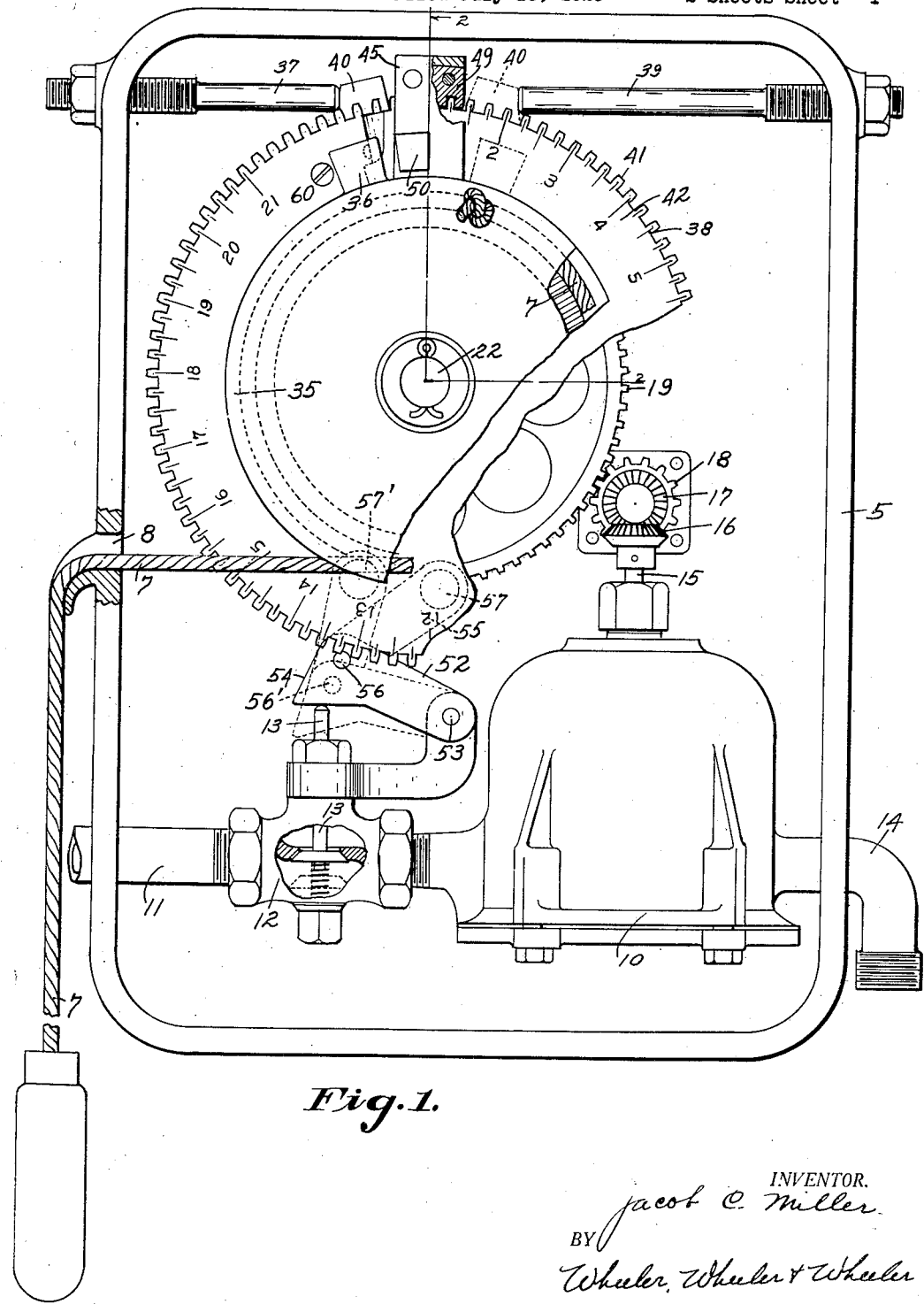
Figure 1 is a front elevation of the mechanism as it appears when the door of the case or housing therefor is open.
Figure 2:
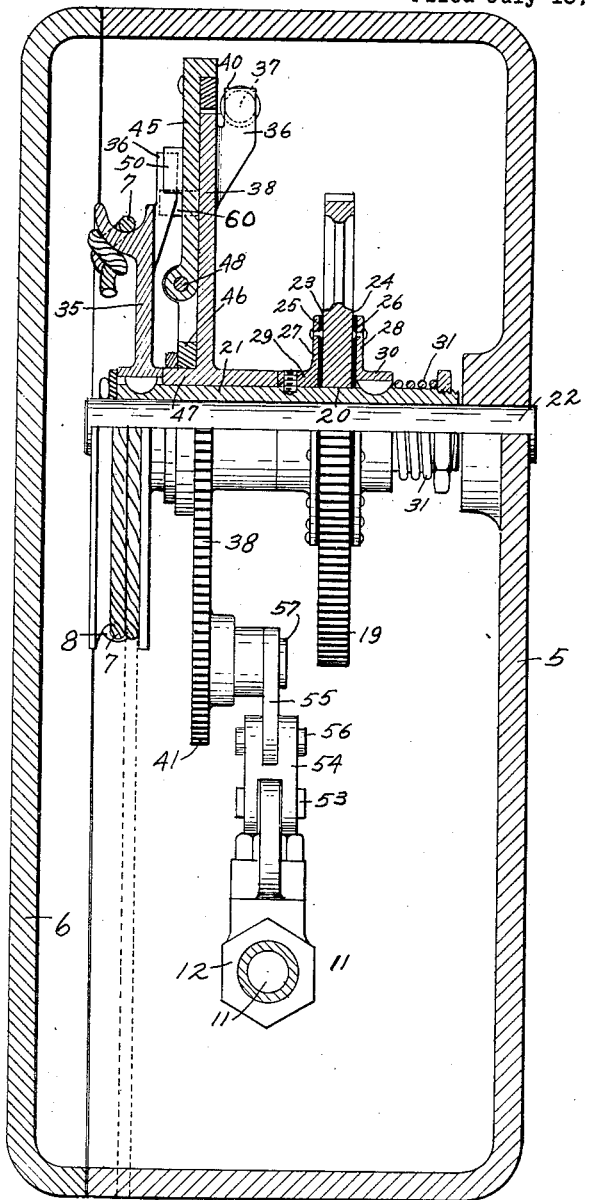
Figure 2 is a section taken in the plane indicated by line 2—2 in Figure 1.

The mechanism is housed within a case 5 having a cover 6. It is important to note that the mechanism hereinafter to be described may be reset by means of a tension device which may comprise a rope such as that illustrated at 7 and which passes through an opening 8 in case 5. Because of this arrangement, it is possible to provide the cover 6 with a lock so that the adjustment arrived at within the casing may remain undisturbed and make the delivery of the designated quantity of liquid a prerequisite to the operation of the device.

Within case 6 is a meter 10 which may be of any desired construction. It is supplied with liquid through a pipe 11 controlled by a valve 12 which has a projecting valve stem 13. The liquid passing through the meter may be delivered through a pipe 14.

The meter shaft 15, which rotates in direct proportion to the amount of water passing through the meter, furnishes power for the operation of mechanism which operates the valve stem 13 to close valve 12 after the passage of a predetermined quantity of liquid. This mechanism will now be described.

The shaft 15 carries a double gear 16 which drives the complementary gears 17 and pinion 18 which meshes with the large spur gear 19. This spur gear is provided with a bearing at 20 permitting it to rotate with respect to the tubular shaft 21 supported by the stud 22. A friction clutch mechanism is provided which normally engages gear 19 with the tubular shaft 21 but permits of the independent rotation of the shaft upon the occasion of resetting the mechanism.

The friction clutch comprises a pair of opposing friction surfaces 23 and 24 which are provided on gear 19 and a complementary set of friction disks 25 and 26 which are mounted respectively upon flange portions 27 and 28 of collars 29 and 30. Collar 29 is secured by a set screw to the tubular shaft 21 whereas collar 30 is splined thereto and subjected to the compression of spring 31 whereby the clutch disks are forced into operative pressure relation to the interposed gear 19.

Keyed to the tubular shaft 21 to rotate therewith is the sheave or drum member 35 about which is wound the tension strap or rope 7 for one revolution or more before it passes through the aperture 8 in the casing. The direction in which such rope is wound upon the sheave 35 is such that when the rope is pulled it will rotate shaft 21 in a direction opposite to that in which the shaft is rotated by the gearing and friction clutch heretofore described from meter shaft 15. A radially projecting arm 36 carried by the sheave is adapted to transmit motion through an indexing pawl to the dial 38 which is connected to operate the valve stem 13.

The dial is rotatably mounted upon the tubular shaft 21 but its rotation is restrained by means of the adjustable stops 37 and 39 between which the lug 40 carried by dial 38 is confined. The dial is preferably toothed at 41 like a gear and is provided adjacent to the teeth with a scale or index 42 which may conveniently be used in setting the adjustable index pawl 45.

The index pawl carrier 46 is mounted on the hub 47 of the dial or valve actuating rotor 38 for independent rotative movement. The pawl 45 is pivoted to its carrier 46 by means of a pintle pin 48. A gear segment 49 carried by pawl 45 is adapted in the vertical position of the pawl to mesh with any desired set of teeth 41 on the index dial 10. It will be obvious that pawl 45 may be oscillated to disengage segment 49 from the teeth of the dial and that the pawl and its carrier may, thereupon, be rotated to any desired position about the indexing scale carried by the dial and may be re-engaged with the dial in such desired position. The indexing pawl carries a lug 50 which projects into the path of rotation of the radially projecting arm 36 on sheave 35 so that, in any position of the pawl, motion will ultimately be transferred to it and to the dial 38 through the engagement of arm 36 and lug 50.

Figure 1 shows the valve stem 13 in its raised position in which the valve is closed. The valve lever 52 which is fulcrumed at 53 and carries a valve depressing head 54 is also illustrated in its raised position in Figure 1. A link 55 is pivoted at 56 to the lever and at 57 to the dial or valve operating rotor 38 with the valve stem 13 and the lever 52 in their raised positions. The length of link 55 is such that the dial or rotor 38 is in its extreme position of counter-clockwise rotation with the lug 40 abutting stop 37.

When the lug 40 moves in a clockwise direction, as viewed in Figure 1, to a position of engagement with stop 39, the pivot 57 moves to the point indicated in dotted lines at 57′ which is just across the radius of the dial 38 which may be projected to pivot 56 in the position 56′ thereof. With the parts in these positions, the valve stem 13 is depressed by means of valve lever 52 and the valve is opened to permit the passage of water through the meter to the delivery pipe 14.

It will be understood, of course, that the valve illustrated is an automatically self-closing valve, and, in view of the fact that link 55 has slightly passed a dead center position, the pressure of the valve stem in response to the valve spring will tend to maintain lug 40 in engagement with stop 39. It will be obvious, however, that a very slight degree of power will be required to throw link 55 across center to a position such that the spring pressure exerted by stem 13 may act to rotate dial 38 to the position in which it is illustrated in full lines in Figure 1, thereby permitting lever 52 to raise and the valve to close.

In the operation of the device, the pawl 45 is hingedly oscillated to disengage sector 49 from the teeth 41 of the indexing dial. Thereupon, the pawl and its carrier are rotated to a desired index reading with reference to the dial and the pawl is thereupon restored to a vertical position to mesh its segment 49 with the dial in the desired reading. The mechanism is now set for the delivery of successive batches of liquid in the quantities designated by the index reading of the pawl upon the dial, the dial preferably being calibrated in units of measure, such as gallons or the like.

The cover of the case is closed and may be locked if desired to preserve the adjustment thus made. Thereafter the device may be reset as many times as desired to measure out the quantity of liquid indicated by such adjustment.

The setting of the mechanism is accomplished simply by pulling the rope 7 as far as it will go. The rope, being wound upon sheave 35, rotates the sheave and shaft 21 and friction disks 25 and 26 in a clockwise direction, as viewed in Figure 1. Such rotation will continue until the lug 36 strikes the trip member 50 carried by dial 38 and for such time thereafter as is required for the resulting movement of the dial sufficient to adjust lug 40 from a position of engagement with stop 37 to a position of engagement with stop 39. The sheave must be rotated the full amount required to effect this adjustment of the dial since, until the dial reaches its ultimate clockwise position, it will not maintain the valve in its open position. It will be remembered that upon the completion of the dial movement aforesaid the link 55 has crossed dead center and is holding the valve lever 52 depressed and thereby maintaining the self-closing valve stem 13 in its open position.

The ordinary water meter does not develop a great deal of power and hence rope 7 must be released when it has been pulled as far as it can go in order to set the mechanism. Upon the release of the rope, the meter operates and permits flow therethrough to produce a corresponding rotation of shaft 15 whereby gear 19 is rotated to operate the tubular shaft 21 and sheave 35. The sheave rotates in a counter-clockwise direction when acted upon by the meter.

It will be remembered that the sheave is starting its rotation from a position such that the arm 36 thereof is in abutment with the trip 50 on the index pawl. Accordingly, it will be obvious that the angular spacing between lug 50 on the index pawl and trip 60 will determine the length of time for which the meter-induced relation of the sheave may continue before the valve closes. When the sheave arm 36 ultimately encounters trip 60 counter-clockwise rotation will be given to the indexing dial which will almost immediately throw the link 55 across center, thereby permitting the valve stem 13 to spring upwardly and throw the dial to its full line position in Figure 1.

Another tug upon rope 7 will reset the valve mechanism and the trip mechanism, open the valve, and permit flow to continue until a like quantity of liquid has again been measured. It will be obvious that this device provides a simple and effective way of measuring with great exactness the quantity of liquid required for a given batch, thereby making it possible to insure against carelessness or intentional fraud on the part of the operator.

I claim:

1. In a batch measuring mechanism, the combination with a valve and a meter provided with a shaft operable in accordance with flow through said valve, of meter operated means for closing said valve comprising a part normally connected with said meter shaft for rotation thereby, means for the manual operation of said part independently of said shaft in a direction contrary to the direction of shaft operation thereof, and a valve control mechanism provided with trip means engageable by said part in its direction of manual rotation for the opening of said valve, and trip means engageable by said part in its direction of meter operated rotation for the closing of said valve.

2. In a batch measuring mechanism, the combination with a valve and a meter provided with a shaft operable in accordance with flow through said valve, of meter operated means for closing said valve comprising a part normally connected with said meter shaft for rotation thereby, means for the manual operation of said part independently of said shaft in a direction contrary to the direction of shaft operation thereof, and a valve control mechanism provided with trip means engageable by said part in its direction of manual rotation for the opening of said valve, and trip means engageable by said part in its direction of meter operated rotation for the closing of said valve, said trip means including an adjustable lost motion device whereby the period of meter operation between the opening and closing of said valves may be varied.

3. In a batch measuring device, the combination with a valve and a meter provided with a shaft operable in accordance with flow through said valve, of a valve operating part connected with said valve and adapted in one direction of movement to open said valve and in the other direction of movement to permit said valve to close, a member associated with said part and releasably connected with the meter shaft and provided with separate manually operable connections whereby to be adapted for meter actuation in one direction and manual actuation in the other, trip mechanism carried by said member and engageable with a portion of said part to transmit motion from said member to said part to adjust said part in its valve opening direction in the course of the manual actuation of said member, a second trip mechanism adjustably spaced from said first mentioned trip mechanism on said member and engageable with a portion of said part under the actuation of said meter whereby to transmit movement after a predetermined period of lost motion from said member to said part in a direction to permit the opening of said valve.

4. In a batch measuring device, the combination with a valve and a meter provided with a shaft operable in accordance with flow through said valve, of a valve operating part connected to the valve and adapted in one direction of movement to open said valve and in the other direction of movement to permit said valve to close, a member associated with said part and provided with a handle and friction drive connections with the meter shaft for meter actuation in one direction and manual actuation in the other, trip mechanism connected with said member and engageable with said part to transmit motion from said member to said part to adjust said part in its valve opening direction in the course of the manual actuation of said member, a second trip mechanism provided with a rotatively adjustable connection with said member in a range of positions spaced from said first mentioned trip mechanism and adapted in such space to permit the independent movement of said member under the actuation of said meter and ultimately engageable with said part to transmit movement from said member to said part in a direction to permit the opening of said valve.

5. In a device of the character described, the combination with a valve mechanism and a meter connected with said valve and provided with a shaft operable in accordance with flow therethrough, of a sheave provided with motion transmitting connections to said shaft whereby to be adapted to receive power therefrom, a friction clutch in said connections, a tension member wound upon said sheave and provided with a manually operable end, the direction of winding on said tension member being adapted to produce sheave rotation in opposition to the direction of rotation of said sheave through said connections from said meter shaft, a valve operating rotor adjacent said sheave connections between said rotor and valve, and trip mechanism including parts carried by the sheave and rotor and operatively engageable for the transmission of motion from said sheave to said rotor in either direction of rotation of said sheave, whereby the rotation of said sheave in one direction is adapted to produce a valve opening movement of said rotor and the rotation of the sheave in the opposite direction is adapted to produce a valve closing movement of said rotor.

6. The combination with a valve in a meter provided with a shaft operable in accordance with flow through said valve, of a valve operating rotor mounted for limited rotative movement, a link connecting said rotor with said valve for the transmission of movement to said valve and adapted in the valve opening position of said rotor to lie immediately adjacent a dead center position, a manually operable rotor associated with said first mentioned rotor, trip mechanism adapted to transmit movement between said rotors and including a part adjustable upon one of said rotors and a complementary part upon the other rotor engageable therewith whereby to permit of a predetermined degree of lost motion between said rotors, and friction coupled motion transmitting connections between said manually operable rotor and the shaft of said meter, said meter shaft being rotatable in a direction for the operation of said rotors to adjust said link to a position remote from its dead center position, thereby permitting the closing of said valve.

7. The combination with a valve of a rotary valve operating part, a valve lever, a link connecting said lever with said part and adapted in one position of said part to approximate a dead center position, and thereby to force said valve open, manually operable means for adjusting said part toward said position, and flow operated means provided with lost motion connections to said part for the adjustment thereof in a direction to trip said link from its dead center position, thereby permitting said valve to close.

8. The combination with a valve of the self-closing type, of a valve operating rotor provided with a link connected to said valve and pivoted to said rotor at a point such as to lie adjacent the projected radius of said rotor in the open position of said valve, a second rotor, interacting trip members carried by said rotors and adapted in one direction of rotation of said second rotor to interact for the adjustment of said first mentioned rotor toward said position, said second rotor being manually operable in said direction, an additional trip complementary to a part of said first mentioned trip mechanism and adapted to enable the movement of said second rotor in the other direction to be transmitted to said first rotor, whereby to move said first rotor in a valve closing direction, and flow operated means operatively connected to said second rotor for the movement thereof in said last mentioned direction.

9. The combination with a valve of the self-closing type, of a meter connected with said valve and provided with a shaft operable in accordance with flow therethrough, friction clutch mechanism operatively connected with said meter shaft to receive motion therefrom, a rotor arranged to be driven in one direction by said friction clutch mechanism and manually operable in the opposite direction independently of said meter shaft, a dial, a valve operating member linked with said dial for the opening of said valve in one direction of dial movement and the closing of said valve in the other direction of dial movement, an arm carried by said rotor, a first trip device carried by said dial in the path of said arm in the course of manually operated rotation of said rotor, the direction of engagement between said arm and said first trip mechanism being adapted to transmit valve opening movement through said link, and a second trip mechanism adjustably connected with said dial and disposed in the path of said arm in the course of meter operated movement of said rotor, the engagement of said arm and said second trip mechanism being adapted to rotate said dial in valve closing direction.

10. The combination with a valve of the self-closing type, of a meter connected with said valve and provided with a shaft operable in accordance with flow therethrough, friction clutch mechanism operatively connected with said meter shaft to receive motion therefrom, a rotor arranged to be driven in one direction by said friction clutch mechanism and manually operable in the opposite direction independently of said meter shaft, a dial, a valve operating member linked with said dial for the opening of said valve in one direction of dial movement and the closing of said valve in the other direction of dial movement, an arm carried by said rotor, a first trip device carried by said dial in the path of said arm in the course of manually operated rotation of said rotor, the direction of engagement between said arm and said first trip mechanism being such as to transmit valve opening movement through said link, and a second trip mechanism adjustably connected with said dial and disposed in the path of said arm in the course of meter operated movement of said rotor, the engagement of said arm and said second trip mechanism being in a direction such as to effect a dial closing movement of said valve, one of said trip mechanisms comprising a pawl carrier, a pawl hinged thereto, and an indexing mechanism engageable and disengageable between said pawl and dial in the hinged adjustment of said pawl, a plurality of points on said dial being formed to receive engagement of said indexing mechanism.

11. In a device of the character described, the combination with a valve and a meter communicating with said valve and provided with a shaft rotatable in accordance with flow through said valve, of manually operable means for opening said valve, motion transmitting connections between said shaft and said means for the adjustment of said means in a valve closing direction, and connections to said valve including a lost motion device adjustable to permit of a predetermined rotation of said meter shaft preliminary to the closing of said valve, together with a casing enclosing said valve, said meter, and said lost motion device and through which said manually operable means is readily operable for the opening of said valve, the closing means of said valve being protected by said casing so as to make manual operation thereof impossible.

12. The combination with a valve, of manually operable means for the opening thereof, said means comprising a mechanism adapted to maintain said valve in its open position to permit continued flow therethrough, a flow responsive device adapted to be operated by flow through the valve, a trip operated by said device for the closing of said valve, a casing enclosing all parts having to do with the closing of said valve and through which a portion of said manually operable valve opening means extends, said portion being inoperative for the closure of said valve.

13. In a device of the character described, the combination with a flow responsive device and a valve controlling flow therethrough, of a lost motion mechanism interposed between said device and said valve and operatively connected to control the closing of said valve, means for manually setting said lost motion mechanism for a predetermined interval of travel, said mechanism being operatively connected to said valve for the opening thereof in the final stage of its setting.

14. The combination with a flow operated device and a valve associated therewith for the control of fluid therethrough, of valve operating means including a lost motion mechanism operatively provided with a manually operable member for the adjustment thereof in a direction to set said mechanism and ultimately to open said valve and with connections from said device adapted to operate said mechanism in a valve closing direction and ultimately to permit the closing of said valve after an interval of lost motion.

15. A batch measuring device comprising the combination with a valve and a meter mechanism having a shaft responsive to flow through the valve, of lost motion connections from said shaft to said valve for the closure thereof, said connections including a re-setting part normally connected to turn with said shaft and manually movable oppositely to the direction of shaft rotation and provided with valve opening means.

16. A batch measurer comprising the combination with a valve and a meter mechanism having a shaft responsive to flow through the valve, of a valve operating part connected with the valve to control the opening and closing thereof, a lost motion device including connections for driving said part from said shaft in a valve closing direction, and a handle connected with said lost motion device for operating it in a valve opening direction, said lost motion device being reset in the valve opening movement.

17. A batch measurer comprising the combination with a valve and a meter mechanism having a shaft responsive to flow through the valve, of a valve operating part including detent means operable through said part to hold said valve in open position and release it therefrom, lost motion driving connections for said part operatively driven from said shaft and including a rotor having trips of which one is adjustably positioned for engagement with said part, and a handle connected with said rotor for turning it in opposition to movement thereof by said shaft for re-setting said connections and opening said valve, said detent means being releasable through the operation of said part from said shaft.

18. A batch measurer comprising a valve, a meter having a shaft, a valve operating part provided with meter and manually operable connections for turning it in opposite directions, and a lost motion device through which both of said connections act on said part, said device including trip contacts spaced in the direction of manual operation thereof, and a positive connection from said part to said valve adapted to open the valve when the part moves in the direction of manual operation and to close the valve when the part moves in the direction of meter operation.

JACOB C. MILLER.